United States Patent
Margolis et al.

(10) Patent No.: US 9,978,180 B2
(45) Date of Patent: May 22, 2018

(54) FRAME PROJECTION FOR AUGMENTED REALITY ENVIRONMENTS

(71) Applicant: MICROSOFT TECHNOLOGY LICENSING, LLC, Redmond, WA (US)

(72) Inventors: Jeffrey Neil Margolis, Seattle, WA (US); Matthew Crisler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 15/005,702

(22) Filed: Jan. 25, 2016

(65) Prior Publication Data
US 2017/0213388 A1 Jul. 27, 2017

(51) Int. Cl.
*G06T 19/00* (2011.01)
*H04N 19/139* (2014.01)
(Continued)

(52) U.S. Cl.
CPC .......... *G06T 19/006* (2013.01); *G02B 27/017* (2013.01); *G06F 3/013* (2013.01); *H04N 19/139* (2014.11); *G02B 2027/0178* (2013.01)

(58) Field of Classification Search
CPC .......... G06F 3/011; G06F 3/013; G06F 3/017; G06T 7/20; G06T 7/215–7/248;
(Continued)

(56) References Cited

U.S. PATENT DOCUMENTS 4,982,280 A 1/1991 Lyon et al.
6,057,847 A 5/2000 Jenkins
(Continued)

FOREIGN PATENT DOCUMENTS

WO 2006054201 A1 5/2006
WO 2015085922 A1 6/2015

OTHER PUBLICATIONS

International Search Report and Written Opinion Issued in PCT Application No. PCT/US2017/013590, dated Mar. 31, 2017, 13 Pages.
(Continued)

*Primary Examiner* — Nathan Danielsen
(74) *Attorney, Agent, or Firm* — Rainier Patents, P.S.

(57) ABSTRACT

Motion vector estimation is provided for generating and displaying images at a frame rate that is greater than a rendering frame rate. The displayed images may include late stage graphical adjustments of pre-rendered scenes that incorporate motion vector estimations. A head-mounted display (HMD) device may determine a predicted pose associated with a future position and orientation of the HMD, render a current frame based on the predicted pose, determine a set of motion vectors based on the current frame and a previous frame, generate an updated image based on the set of motion vectors and the current frame, and display the updated image on the HMD. In one embodiment, the HMD may determine an updated pose associated with the HMD subsequent to or concurrent with generating the current frame, and generate the updated image based on the updated pose and the set of motion vectors.

20 Claims, 12 Drawing Sheets

(51) Int. Cl.
*G06F 3/01* (2006.01)
*G02B 27/01* (2006.01)

(58) Field of Classification Search
CPC .. G06T 7/70–7/77; G06T 19/00–19/20; G06T 2207/20221; G06T 2207/20228; G06T 2207/30196; G06T 2207/30201; G06T 2207/30244; G02B 27/0172; G02B 27/0093; G02B 2027/014; G02B 2027/0178; H04N 19/134–19/139; G09G 3/007
See application file for complete search history.

(56) References Cited

U.S. PATENT DOCUMENTS

| | | |
|---|---|---|
| 6,384,859 B1 | 5/2002 | Matsumoto et al. |
| 6,623,428 B2 | 9/2003 | Miller et al. |
| 7,489,350 B2 | 2/2009 | De Haan et al. |
| 8,698,701 B2 | 4/2014 | Margulis |
| 8,767,096 B2 | 7/2014 | Horii |
| 9,240,069 B1 | 1/2016 | Li |
| 2003/0193486 A1 | 10/2003 | Estrop |
| 2006/0017843 A1 | 1/2006 | Shi et al. |
| 2007/0126928 A1 | 6/2007 | Klompnhouwer et al. |
| 2010/0039557 A1 | 2/2010 | Mori et al. |
| 2010/0271484 A1* | 10/2010 | Fishwick ............ G06T 7/238 348/169 |
| 2012/0155743 A1* | 6/2012 | Kim .................... G06T 5/50 382/154 |
| 2014/0375679 A1 | 12/2014 | Margolis et al. |
| 2015/0002542 A1* | 1/2015 | Chan .................... G06T 7/70 345/633 |
| 2015/0029218 A1 | 1/2015 | Williams et al. |
| 2015/0040074 A1 | 2/2015 | Hofmann et al. |
| 2015/0310665 A1 | 10/2015 | Michail et al. |

OTHER PUBLICATIONS

Hui-Ping, et al., "Adaptive Interpolation/Extrapolation and Motion Vector Processing Method for Frame Rate Up Conversion", In Proceedings of the Fifth International Conference on Image and Graphics, Sep. 20, 2009, pp. 18-22.

Park, et al., "Handling Motion-Blur in 3D Tracking and Rendering for Augmented Reality", In Journal of Latex Class Files, vol. 6, Issue 1, Jan. 2007, pp. 1-12.

Maitre, et al., "3-D Model-Based Frame Interpolation for Distributed Video Coding of Static Scenes", In Proceedings of IEEE Transactions on Image Processing, vol. 16, Issue 5, May 2007, pp. 1246-1257.

Zhai, et al., "A Low Complexity Motion Compensated Frame Interpolation Method", In Proceedings of International Symposium on Circuits and Systems, May 23, 2005, pp. 4927-4930.

"Second Written Opinion Issued in PCT Application No. PCT/US2017/013590", dated Jul. 18, 2017, 7 Pages. (MS# 358408-WO-PCT).

* cited by examiner

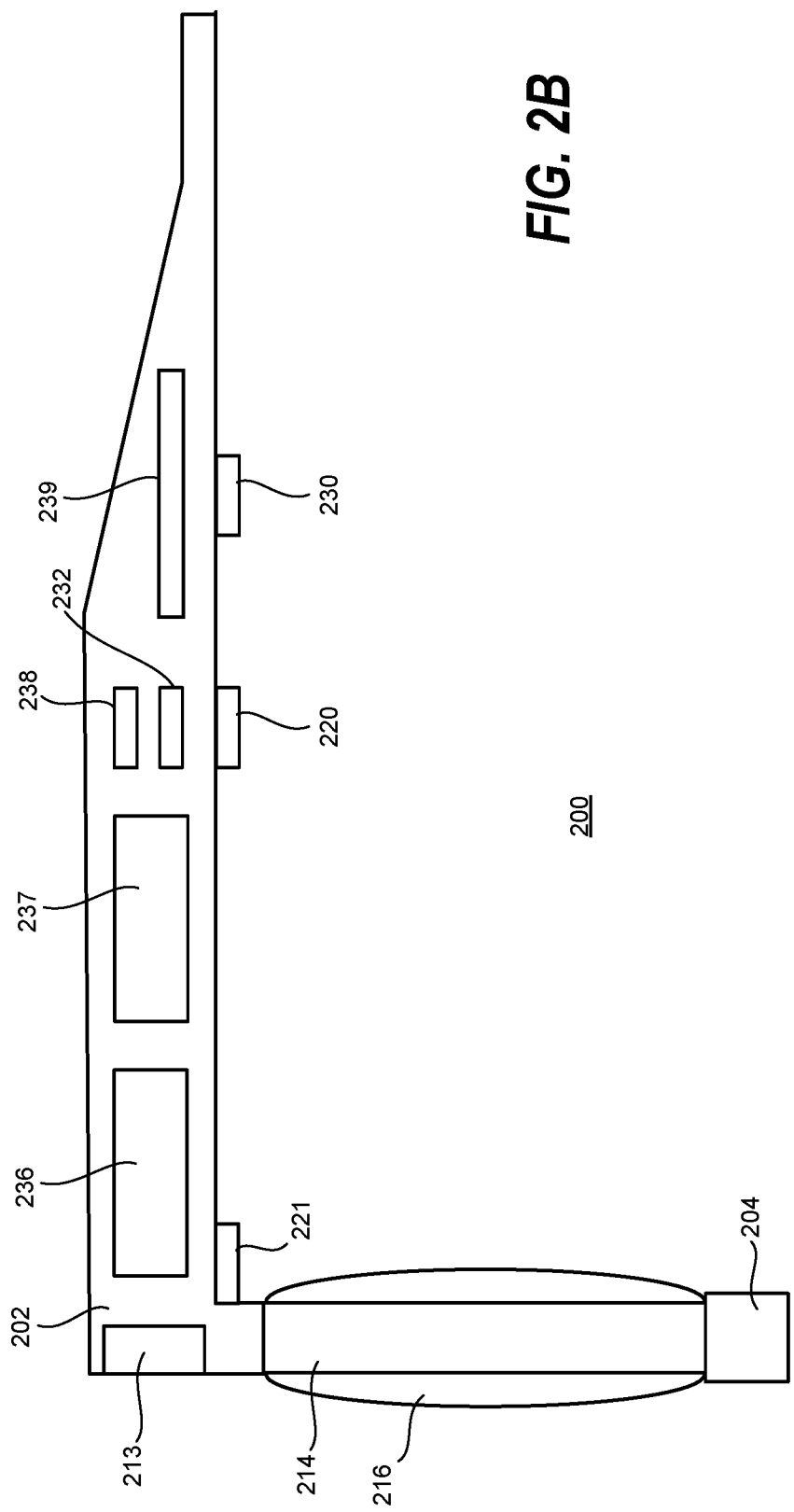

FRAME PROJECTION FOR AUGMENTED REALITY ENVIRONMENTS

BACKGROUND

The present disclosure relates to digital signal processing for generating and displaying images.

Augmented reality devices are one example of mobile devices having both high performance and reduced power consumption requirements. Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular pose associated with the mobile device that needs to be augmented as the mobile device moves within the real-world environment.

An AR environment may be provided to an end user of a mobile device using an electronic display (e.g., an LED display integrated with a head-mounted display device). The electronic display may display images of virtual objects to the end user by modulating light provided to the electronic display (e.g., a liquid crystal on silicon display) or by generating light within the electronic display (e.g., an OLED display). An OLED, or organic light emitting diode, is an LED in which the emissive electroluminescent layer comprises an organic film. An OLED display may comprise a passive matrix OLED display or an active matrix OLED display. An active matrix OLED display uses one or more thin-film transistors (TFTs) within each OLED pixel for controlling the amount of light generated per pixel. In one example, each OLED pixel may comprise a first TFT for driving an OLED and a second TFT for latching data for controlling the first TFT. The TFTs may comprise polysilicon TFTs or amorphous silicon TFTs. In some cases, an OLED display may comprise groups of red, green, and blue emitting sub-pixels (i.e., each of the OLED pixels may comprise a plurality of LEDs for generating red, green, and blue light). An OLED display may also comprise groups of cyan, yellow, magenta, and white emitting sub-pixels.

SUMMARY

Digital signal processing using motion vector estimation is provided for generating and displaying images at a frame rate that is greater than a rate at which new images are rendered. The displayed images may include late stage graphical adjustments of pre-rendered scenes that incorporate motion vector estimations. A head-mounted display (HMD) device may determine a predicted pose associated with a future position and orientation of the HMD, render a current frame based on the predicted pose, determine a set of motion vectors based on the current frame and a previous frame, generate an updated image based on the set of motion vectors and the current frame, and display the updated image on the HMD. In one embodiment, the HMD may determine an updated pose associated with the HMD subsequent to or concurrent with generating the current frame, and generate the updated image based on the updated pose and the set of motion vectors.

The HMD may calculate a set of motion vectors using the current frame and a transformation of the previous frame. The HMD transforms the previous frame based on pose information used to render the current frame to remove camera translational and rotational differences in order to determine animation displacements between frames. Motion vector velocities may be determined using the displacements and the display time of the frames. The motion vectors are used to forward project each frame based on one or more target display times to provide animation correction for the updated image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2B depicts one embodiment of a portion of an HMD.

DETAILED DESCRIPTION

Figure 1:
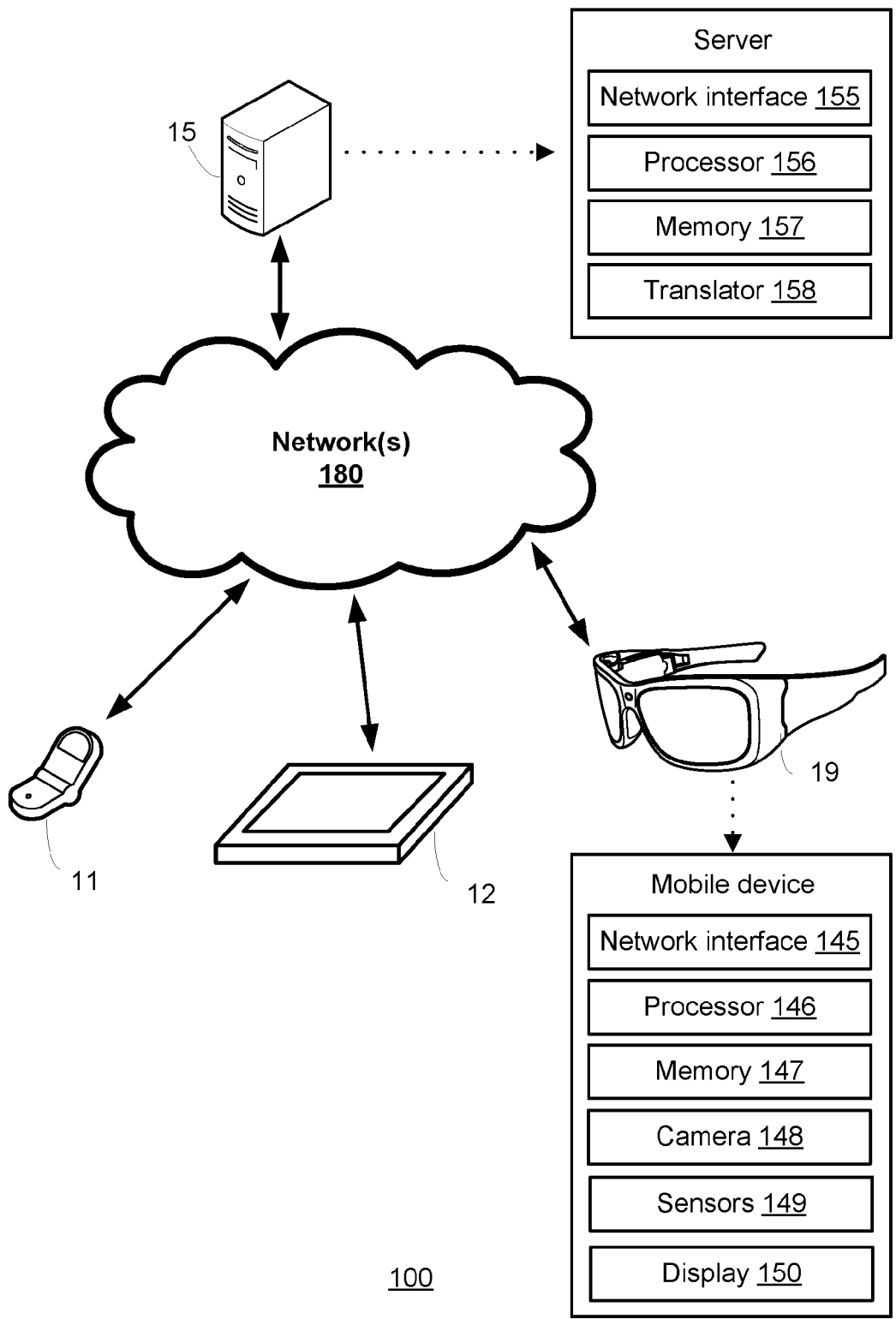
FIG. 1 is a block diagram of one embodiment of a networked computing environment in which the disclosed technology may be practiced.

Technology is described for digital signal processing using motion vector estimation to generate images at a frame rate this greater than a rendering frame rate. In one embodiment the technology is used to generate and display images associated with one or more virtual objects within an augmented reality (AR) environment. The displayed images may include late stage graphical adjustments of pre-rendered scenes (i.e., forward predicted scenes that are rendered at the rendering frame rate) in order to incorporate motion vector estimations. The rendering frame rate may correspond with the minimum time to render images associated with a pose of a head-mounted display (HMD) device. The HMD may determine a predicted pose associated with a future position of the and orientation of the HMD (e.g., a predicted pose of the HMD 10 ms or 20 ms in the future), render a current frame based on the predicted pose, determine a set of motion vectors based on the current frame and a previous frame, generate an updated image based on the set of motion vectors and the current frame, and display the updated image on the HMD. In one embodiment, the HMD may determine an updated pose associated with the HMD subsequent to or concurrent with generating the current frame, and generate the updated image based on the updated pose and the set of motion vectors.

In one embodiment, the HMD calculates a set of motion vectors using the current frame and a transformation of the previous frame rendered at the rendering frame rate. The HMD transforms the previous frame to simulate the predicted pose used to render the current frame. The system may generate a projected image from the previous frame that simulates the previous frame as if it had been rendered at the current camera or device position and orientation. The transformation of the previous frame removes camera translational and rotational differences between the two frames. The transformation of the current frame to a projected image may be generated via a homographic transformation and/or a pixel offset adjustment of the current frame.

After transformation to remove camera movement, the HMD analyzes the previous frame and the current frame to determine animation within the scene. For blocks of one or more pixels, the HMD can determine a displacement between the previous frame and the current frame. Various techniques for locating and determining motion vectors including direct and indirect methods may be used. With the displacement calculated, the system determines a motion vector velocity for each block based on the time difference between when the rendered frames are to be displayed.

The HMD forward projects the set of motion vectors for the current frame to generate an updated image for display on the HMD. The HMD may access a set of pixel values such as uv values for the current frame. The set of pixel values may be an original set of pixel or a previously modified set based on the current frame and one or more other corrections. The HMD determines one or more target display times for the updated image. The motion vector for each pixel is combined with a target display time to determine an offset for the pixel. The offsets are applied to the pixel values for each pixel to generate a set of modified image components for the current frame. In one embodiment, the set of modified image components is used to determine a set of sampling locations for generating the updated image. The updated image may comprise an image rotation, translation, resizing (e.g., stretching or shrinking), shifting, or tilting of at least a portion of the current frame in order to project animation within the current frame to generate an updated image.

In one embodiment, the HMD forward projects animation from a current frame to a target display time in the future to extrapolate display fields. In another embodiment, the HMD projects animation to a target time between the current frame and a previous frame in order to interpolate display fields. The display fields may be generated at a field rate that is greater than a frame rate of the core rendering pipeline.

In one embodiment, the HMD selectively projects animation from a current frame to alleviate perceived color separation. In a color sequential display, for example, separate color fields may be displayed sequentially for a frame. The HMD forward projects animation based on an individual target display time associated with each color field. Additionally, the HMD can selectively forward project animation for select areas of the display. For example, the HMD may use eye tracking to determine one or more areas of focus such as one or more virtual objects focused on by the user or identifying objects in the scene whose motion correlates with the direction of tracked eye movement. The HMD may forward project the animation within the areas of focus while not forward projecting the animation outside of the areas of focus. In another example, the HMD may forward project the animation of the entire scene by a first amount (e.g., from 30 fps to 90 fps), and forward project the areas of focus by a second amount (e.g., 270 fps).

In one embodiment, the HMD uses reprojected frames as part of an anti-aliasing technique. The HMD may generate from a previously rendered frame a stereo pair of images. Each image of the pair is transformed to simulate pose information associated with a current frame. A stereo pair of images is also generated from the current frame. The HMD can then utilize four images, each simulating or being rendered using the same pose information, to provide anti-aliasing when displaying updated images for the current frame.

The latency or amount of time in which images of world-locked virtual objects corresponding with a particular pose of an HMD are displayed to an end user of the HMD is often an issue in augmented reality environments. For example, if too much time lapses between the time the end user's head turns away from the particular pose and the time an image of a virtual object is displayed based on the particular pose, then the virtual object will appear to drift away from its intended location within the augmented reality environment (i.e., the image may not appear to be aligned with an intended real-world location or object). Thus, there is a need to display correctly aligned images of virtual objects to an end user in order to improve virtual object stability and to improve the augmented reality experience. Moreover, there is a need to provide these images using low rendering rates by core rendering pipelines in order to reduce power and other requirements.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images of an environment. The mobile device 19 may include outward facing cameras that capture images of the environment and inward facing cameras that capture images of the end user of the mobile device. Sensors 149 may generate motion and/or orientation information associated with mobile device 19. In some cases, sensors 149 may comprise an inertial measurement unit (IMU). Display 150 may display digital images and/or videos. Display 150 may comprise a see-through display. Display 150 may comprise an LED or OLED display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). This may be referred to as a world-locked virtual object or view. The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, an HMD, such as mobile device 19, may use images of an environment captured from an outward facing camera in order to determine a six degree of freedom (6DOF) pose corresponding with the images relative to a 3D map of the environment. The 6DOF pose may comprise information associated with the position and orientation of the HMD within the environment. The 6DOF pose may be used for localizing the HMD and for generating images of virtual objects such that the virtual objects appear to exist at appropriate locations within the environment. More information regarding determining a 6DOF pose can be found in U.S. patent application Ser. No. 13/152,220, "Distributed Asynchronous Localization and Mapping for Augmented Reality," incorporated herein by reference in its entirety. More information regarding performing pose estimation and/or localization for a mobile device can be found in U.S. patent application Ser. No. 13/017,474, "Mobile Camera Localization Using Depth Maps," incorporated herein by reference in its entirety.

In some embodiments, an HMD, such as mobile device 19, may display images of virtual objects within an augmented reality (AR) environment at a frame rate that is greater than a rendering frame rate for the core rendering pipeline or rendering GPU. The HMD may modify pre-rendered images or forward predicted images that are rendered at the rendering frame rate based on updated pose estimates that are provided at a higher frequency than the rendering frame rate. In some embodiments, the HMD may generate the pre-rendered image based on a predicted pose at the rendering frame rate (e.g., every 16 ms), determine one or more updated poses associated with the HMD subsequent to generating the pre-rendered image (e.g., every 2 ms), generate one or more updated images based on the one or more updated poses and the pre-rendered image, and display the one or more updated images on the HMD. In some cases, the one or more updated images may be generated via homographic transformations and/or a pixel offset adjustments using circuitry within the display, such as display 150.

Figure 2A:
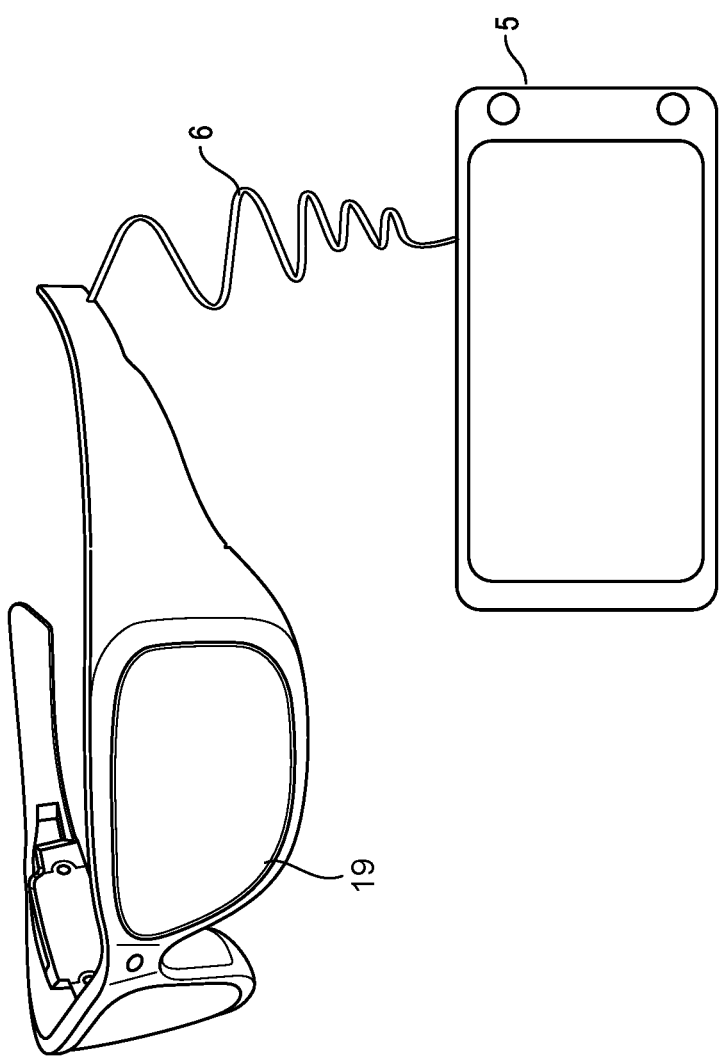
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19. Mobile device 5 may also provide motion and/or orientation information associated with mobile device 5 to mobile device 19. In one example, the motion information may include a velocity or acceleration associated with the mobile device 5 and the orientation information may include Euler angles, which provide rotational information around a particular coordinate system or frame of reference. In some cases, mobile device 5 may include a motion and orientation sensor, such as an inertial measurement unit (IMU), in order to acquire motion and/or orientation information associated with mobile device 5.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include one or more inward facing cameras. In another embodiment, the eye tracking system 221 may comprise an eye tracking illumination source and an associated eye tracking image sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The see-through display may display images of virtual objects by modulating light provided to the display, such as a liquid crystal on silicon (LCOS) display, or by generating light within the display, such as an OLED display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

In one embodiment, the processing unit 236 may include a core rendering pipeline (e.g., comprising one or more graphical processing units) for generating pre-rendered images and a display associated with eye glass 216 may perform late stage graphical adjustments to the pre-rendered images based on later stage pose information associated with the HMD 200 and motion vector estimations. As updated pose information may be provided at a higher frequency than a maximum rendering frame rate for the core rendering pipeline, the late stage graphical adjustments may be applied to the pre-rendered images at a frequency that is greater than the maximum rendering frame rate.

Figure 3:
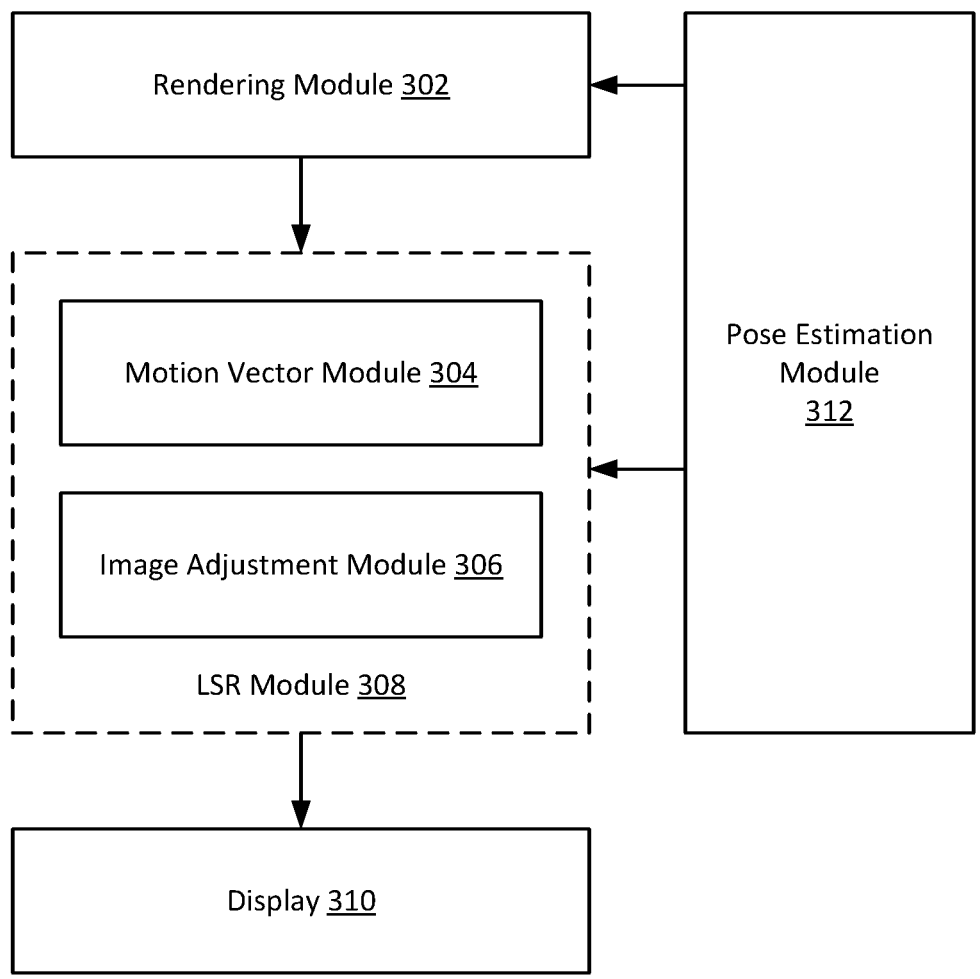
FIG. 3 is a block diagram of a computing system configured to generate and display images associated with one or more virtual objects in accordance with an embodiment of the disclosed technology.

FIG. 3 is a block diagram of a computing system configured to generate and display images that are associated with one or more virtual objects. A late stage reprojection (LSR) module 308 is configured to generate video fields including images at a field rate that is greater than a frame rendering rate for a core rendering pipeline of rendering module 302. Rendering module 302 may include a graphics pipeline, a graphical processing unit (GPU), or computer for example. Rendering module 302 may generate frames including pre-rendered images corresponding with a particular pose of an HMD. The images may be referred to as pre-rendered images because they are rendered prior to be displayed. The particular pose may be provided to the rendering module 302 by pose estimation module 312. The pose estimation module 312 may predict a future pose of the HMD based on movement history of the HMD. In some embodiments, the pose estimation module 312 may predict more than one future pose of the HMD (e.g., three possible future poses for the HMD) and the rendering module 302 may generate a plurality of a pre-rendered images corresponding with the more than one future poses. When updated pose information becomes available, the closest pose (i.e., the best predicted pose) of the more than one future poses may be used for generating updated images by applying late stage graphical adjustments to the corresponding pre-rendered images for the closest pose. In one embodiment, when updated pose information becomes available, instead of a pre-rendered image associated with the closest pose of the more than one future poses being selected, the updated images may be generated using images that are extrapolated and/or interpolated from the plurality of pre-rendered images corresponding with the more than one future poses.

In some cases, the pose estimation module 312 may determine a current pose of the HMD based on camera-based pose tracking information and/or a combination of camera-based pose tracking information and low-latency IMU motion information. The pose estimation module 312 may predict a future pose of the HMD by extrapolating previous movement of the HMD (e.g., the movement of the HMD 5 ms or 10 ms prior to determining the current pose).

The late stage reprojection (LSR) module 308 may perform late stage graphical adjustments to frames including pre-rendered images generated by the rendering module 302 based on updated pose estimation information provided by the pose estimation module 312 and scene animation information provided by the motion vector module 304. In one embodiment, the rendering module 302 may generate pre-rendered images every 16 ms or every 32 ms and the LSR module 308 may generate adjusted images every 2 ms or every 4 ms (i.e., the LSR module 308 may provide images to the display 310 at a field rate that is greater than the maximum rendering frame rate of the rendering module 302). As depicted, the LSR module 308 includes a motion vector module 304 and an image adjustment module 304. Any field rate and rendering rate may be used.

The motion vector module 304 generates animation information to provide late stage graphical adjustments to the pre-rendered images based on motion within the images rendered by rendering module. The motion vector module may apply a homographic or other transformation of a previous image generated by rendering module 302 based on the camera pose associated with a current image generated by rendering module 302. The transformation is applied to remove camera rotational and translation differences between the two images. In this manner, the previous image is transformed to simulate it as if it were rendered from the pose of the current image. The motion vector module 304 may generate projected images by first applying homographic or other transformations to the pre-rendered images (e.g., applying a single plane homography or a multi-plane homography) to simulate these images as is having been rendered from a different camera or device pose.

After transforming the previous image, the motion vector module 304 calculates a set of motion vectors for the pixels of the projected images. A motion vector can be generated for a single pixel or for a block of pixels. A block may include any number of pixels such as one, two four, eight, or sixteen pixels, for example. The motion vector represents the motion within the scene between the two images for the block of pixels. This motion is referred to as the animation motion in reference to movement within the images, as opposed to pose information referring to positioning of the HMD or other device when displaying the images. In one example, the motion vector for a block of one or more pixels is calculated by determining the displacement associated with the block between two images, and then dividing by the time between when the two images were to be displayed to determine a velocity associated with the block.

The image adjustment module 304 may generate adjusted images by applying perspective corrections to account for updated pose information for a pre-rendered image, and by applying animation corrections to account for motion vector information associated with the pre-rendered image. The image adjustment module 304 may generate adjusted images by first applying homographic or other transformations to the pre-rendered images based on updated pose information generated since the pre-rendered image was generated based on the predicted pose. In one example, the image adjustment module 306 may apply an affine transformation to a pre-rendered image. Although not shown, a pixel adjustment module may perform a two-dimensional pixel shifting of an image. The image that is pixel shifted by the pixel adjustment module may comprise a portion of a pre-rendered image or a portion of an image generated by the image adjustment module. In some cases, the LSR module 308 may generate an updated image by applying a homographic transformation to a pre-rendered image and then applying a pixel offset adjustment to the image generated via the homographic transformation.

After applying a homographic transformation or other transformation, the image adjustment module 306 applies animation correction for each pixel of the imaged generated via the transformation. The image adjustment module projects each motion vector based on the time of display for the current image. For example, the image adjustment module can multiply a motion vector by the time at which the image will be displayed to forward project the motion vector. The forward projection results in an offset for each block of pixels, representing the displacement or animation for that pixel between the two images. The offset in one example, is a uv or other component value by which a pixel value should be adjusted. In this manner, the image adjustment module 306 adjusts the pre-rendered image after a perspective correction to account for animation within the scene since generating the pre-rendered image.

The adjusted images generated by the LSR module 308 may be displayed on display 310. In one embodiment, the display 310 may comprise an OLED display. In some embodiments, portions of the LSR module 308 may be integrated with the display 310. In one example, the pixel adjustment module may be performed using shift registers or other circuitry within the display 310 for allowing the shifting of pixel values within a pixel array of the display 310. In one example, the motion vector module 304, image adjustment module 306, and pixel adjustment module may be performed by a controller or processor integrated with the display 310.

Figure 4:
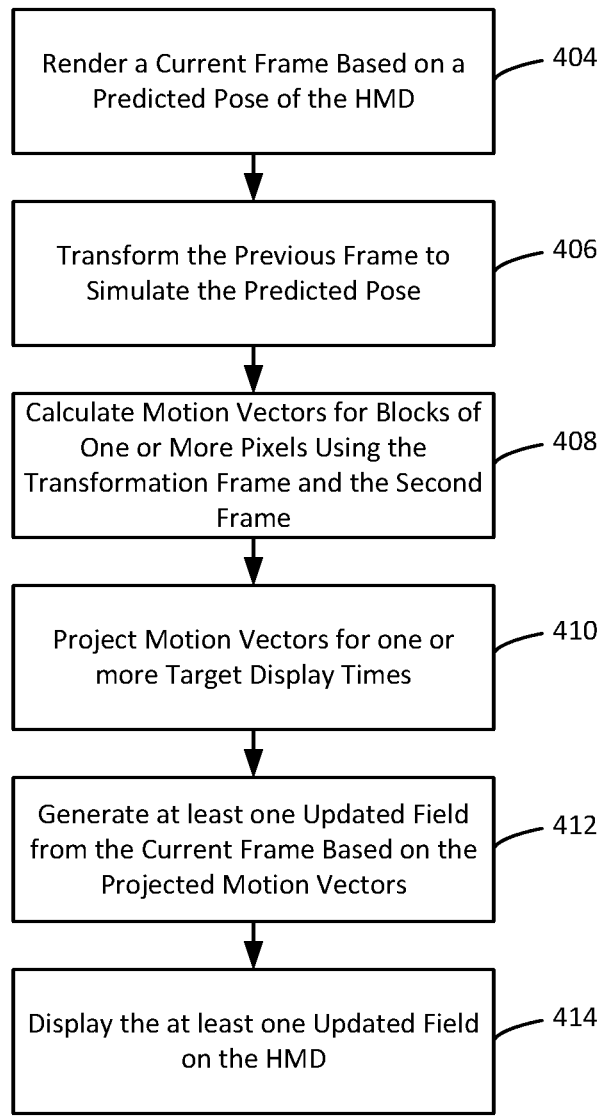
FIG. 4 is a flowchart describing a process of using motion vectors for generating and displaying images in accordance with an embodiment of the disclosed technology.

FIG. 4 is a flowchart describing a process of using motion vectors for generating and displaying images associated with virtual objects at a field rate than is greater than a rendering frame rate. In one embodiment, the process of FIG. 4 may be performed by an HMD, such as mobile device 19 in FIG. 1.

At step 404, a rendering module renders a current frame based on a predicted pose of the HMD. The current frame includes a rendered image. When rendering each frame, the HMD may acquire a pose history associated with the HMD. The pose history may comprise positions, orientations, and movements of the HMD over time. A current pose of the HMD can be determined using camera-based pose tracking, for example. A predicted pose of the HMD is determined based on the current pose and the pose history. The predicted pose may correspond with a first point in time (e.g., 8 ms or 16 ms in the future or the past from when the current pose was determined). The predicted pose may be determined based on a current position and orientation of the HMD and an acceleration and a velocity of the HMD immediately prior to determining the predicted pose (e.g., by extrapolating the predicted pose based on movement of the HMD 5 ms or 10 ms prior to determining the predicted pose). The rendering module renders the current frame including an image based on the predicted pose. The rendered image may be rendered using a GPU or other rendering system that has the ability to render a three-dimensional scene into a two-dimensional image given the predicted pose.

At step 406, the previous frame rendered by the rendering module is transformed to simulate the predicted pose associated with the current frame. The system stores each frame for at least one additional render cycle after it is displayed. The LSR accesses the previous frame and distorts it to appear as if it were rendered using the predicted pose of the current frame. By transforming the previous frame to simulate the predicted pose of the current frame, any camera rotational and/or translational differences between the two frames is removed. In one embodiment, transforming the previous frame generates a projected image. The projected image is projected to the pose associated with the current frame. With the pose differences between the two frames removed, the two frames can be analyzed to determine animation within the scene of both frames.

In one embodiment, the previous frame may be adjusted by applying an image transformation to the pre-rendered image of the previous frame. The previous frame may be adjusted based on a pose difference between the pose estimation for the current frame and the pose estimation for the previous frame. In one example, the image transformation may comprise an image rotation, translation, resizing (e.g., stretching or shrinking), shifting, or tilting of at least a portion of the pre-rendered image. The transformed image may be generated via a homographic transformation of the pre-rendered image. In some cases, the homographic transformation may comprise a multi-plane homography, a single plane homography, and/or an affine homography.

In some embodiments, the transformed image may be generated by applying a pixel offset adjustment to the pre-rendered image. The degree of the pixel offset adjustment may depend on a difference between the pose estimation of the current frame and the pose estimation of the previous frame. An image of a virtual object, for example, may be pixel shifted in both the X-dimension and the Y-dimension. In one embodiment, the transformed image may be generated using a pixel offset adjustment or a combination of homographic transformations and pixel offset adjustments. The homographic transformations and/or pixel offset adjustments may be generated using a controller or processor integrated with a display or by a host. A homographic transformation may comprise a weighted mapping between pixels (or points) within the current frame and the previous frame.

At step 408, the LSR module calculates motion vectors for blocks of one or more pixels associated with the current frame. For each block, the LSR module determines a displacement between the current frame and the transformation of the previous frame. With the camera pose information removed, the displacement represents movement within the scene at the block of pixels between the current frame and the previous frame. The LSR module can divide the displacement by the time between when the two frames are to be displayed to determine a motion vector velocity for the block of pixels. For example, the current frame may be rendered some time following the previous frame. The time between display of the two frames corresponds to the frame rate (e.g., 30 fps, 60 fps) of the rendering module in one embodiment.

At step 410, the LSR module projects each motion vector for one or more target display times. Each motion vector may be multiplied by the time duration between the current frame render and a target display time for the current frame. The motion vector may be projected forward to extrapolate fields from the current frame, or may be projected backwards to interpolate fields between the previous frame and the current frame. The projected motion vectors include an offset that can be applied to each block of pixels to correct for the animation between the time the current frame was rendered, and the intended time at which the current frame will be displayed.

At step 412, the LSR module generates one or more updated fields from the current frame based on the projected motion vectors. The updated fields are generated by modifying the current frame or as will be described hereinafter, one or more earlier modifications or corrections of the current frame. In one embodiment, the LSR module accesses a set of pixel values such as uv values for the current frame. The set of uv values may be the original uv values from the rendering module, or modified uv values resulting from an optical, depth, and/or perspective correction of the current frame. At step 412, the LSR module modifies the uv value for each pixel based on the uv offset calculated for the corresponding block as a result of the motion vector projection. In some cases, the pixel offset adjustments may be performed using a display that incorporates shift registers or other circuitry for allowing the shifting of pixels within a pixel array of the display. In one embodiment, the pixel offset adjustments may be generated using a controller or processor integrated with a display. At step 414, the at least one updated field is displayed on the HMD. The updated image may be displayed using an OLED or other display integrated with the HMD.

The animation correction information may be generated at a higher frequency than the maximum rendering frame rate for the core rendering pipeline. This allows late stage graphical adjustments to be applied to the frames at a frequency that is greater than the maximum rendering frame rate.

Figure 5:
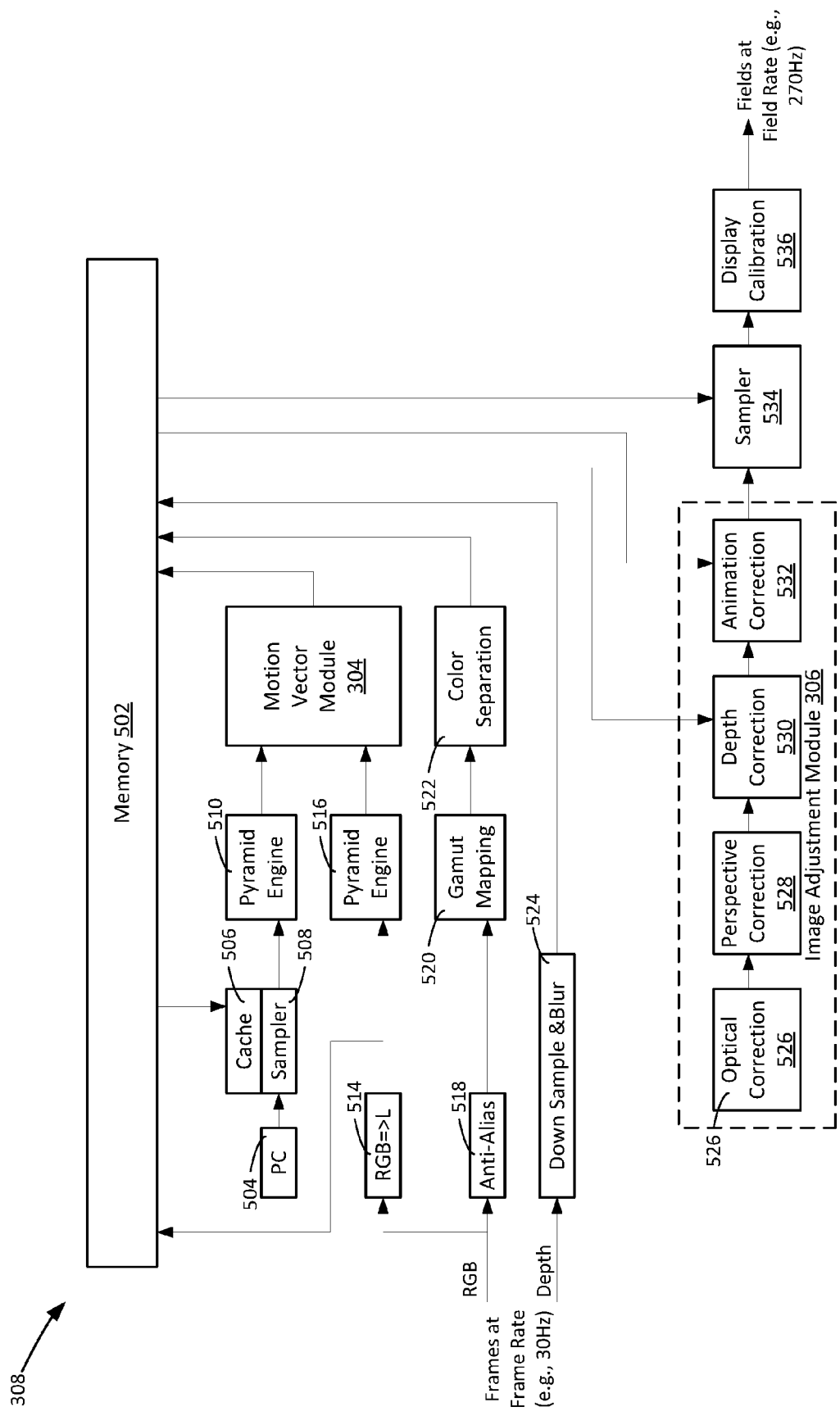
FIG. 5 is a block diagram describing more details of a late stage reprojection (LSR) module in accordance with an embodiment of the disclosed technology.

FIG. 5 is a block diagram describing more details of a late stage reprojection (LSR) module in accordance with an embodiment of the disclosed technology. LSR 308 includes motion vector module 304 and image adjustment module 306 as earlier shown in FIG. 3. The LSR module receives frames from the rendering module at a particular frame rate or maximum frame rate of the core rendering pipeline of the rendering module. The frame rate in FIG. 5 is shown by way of example as 30 Hz, however, any frame rate may be used in accordance with embodiments of the disclosed technology. The LSR generates fields such as images for the display 312 at a field rate that is greater than the maximum rendering frame rate. For example, the field rate of images generated by the LSR module in FIG. 5 is 270 Hz, while the frame rate is 30 Hz. In this manner, the LSR module generates nine fields for display by the HMD for every frame that is received from the core rendering pipeline.

LSR 308 receives for each frame from the rendering module both RGB information and depth information. In another example, the LSR module may receive only RGB information without depth information. The RGB data is received at an anti-alias module 518 that is configured to apply one or more anti-aliasing algorithms to the RGB data. In one example, the anti-alias module is a 1×SMAA, 2×SMAA, 4SMAA hardware circuit for example. The output of anti-aliasing module 518 is provided to a gamut mapping 520 module, and then a color separation module 522. Color separation module 522 may separate color data, such as where individual red, green, and blue fields are used in a color-sequential display for example. The individual color fields may be generated and loaded into the display at different times. Color separation module 522 is omitted in other embodiments. The output of the color separation module is stored in memory 502 for the current frame.

The RGB data for the current frame is received at converter 514 which converts the RGB data to luminance data. In another example, LSR 308 may operate directly on RGB data to generate motion vectors without conversion to luminance data. The luminance data, which may be represented in a luminance channel of the RGB data in one example, is stored in memory 502. Converter 514 may be omitted in one embodiment where the system utilizes RGB or other data for motion vector calculation.

The luminance data is provided to pyramid engine 510 for downsampling the current frame to prepare the data for the motion vector module 304. The pyramid engine may downsample the luminance data to various resolutions (e.g., full resolution, half resolution, quarter resolution, etc.). The downsampled luminance data is provided to motion vector module 304 for generating motion vectors. Although the described example generates motion vectors using luminance data, RGB or other image data may be used to generate motion vectors.

LSR module 308 includes a perspective correction module 504 that operates on a previous frame stored in memory to prepare it for the motion vector module 304. The luminance data for the previous frame is read from memory 502 into cache 506. The perspective correction module 504 transforms the previous frame to the current pose associated with the current frame. The perspective correction module provides a pixel offset to sampler 508 for each pixel or block of pixels for the previous frame in cache 506. The sampler samples the source data in cache 506 according to the pixel offset from perspective correction module 504. The output of sampler 508 includes modified uv values for each pixel in one embodiment. The modified uv values simulate the previous frame using the pose information for the current frame. The modified uv values are provided to pyramid engine 510. The pyramid engine downsamples the luminance data of the transformed frame and provides the downsampled luminance data to motion vector module 304.

Motion vector module 304 receives the downsampled uv values from pyramid engines 510 and 516. The downsampled uv values represent the previous frame and the current frame as if both were rendered using the current pose information. A pixel or grouping of pixel comparison between the two frames can provide displacement data for a block of pixels, representing a displacement associated within the scene animation. For each block of pixels, motion vector module 304 accesses the luminance data for the current frame and the previous frame. The data is compared to determine a displacement for each block over the two frames. Module 304 determines the quotient of the displacement and the time between frames (e.g., the inverse of the frame rate) to determine a velocity representing a motion vector for the block. These velocity-based motion vectors are then stored in memory 502. The time difference between when the rendered frames are to be displayed may be used to determine the motion vector for each block.

Image adjustment module 306 receives the uv or other pixel values for the current frame at the input frame rate (e.g., 30 Hz) and provides an output to sampler 534 for generating updated fields at the output field rate (e.g., 270 Hz). An optional optical correction module 526 can provide an initial modification to the uv values to correct for optical errors associated with the HMD. The optical correction module 526 provides a delta or offset for each pixel in one embodiment. The first set of modified uv values are provided to perspective correction module 528 which performs an additional modification to account for updated pose information received since rendering the current frame.

The perspective correction module 528 can apply a pose difference between the predicted pose at which the current frame was rendered and an updated pose corresponding with the intended display time. The pose difference determines a degree of graphical adjustment to be applied to a portion of the current frame in order to compensate for an incorrect pose prediction when generating the rendered image. The second set of modified uv values is provided to an optional depth correction module which can make additional changes using the blurred depth information read from memory 502. The depth correction can make an additional compensation based on the depth of the scene that was rendered to generate a third set of modified uv values.

The third set of modified uv values are provided to the animation correction module 532. Animation correction module 532 reads the motion vectors from memory 502 that were calculated using the current and previous frames. The animation correction module 532 determines one or more target display times for the current frame in order to generate uv offsets for the current frame. The animation correction module 532 can take the product of the motion vector for a pixel and the difference between the rendering and display time of the current frame to determine on offset for each pixel. The offsets are then applied for each pixel to generate a fourth set of modified uv values.

The fourth set of modified uv values is then provided to sampler 534 to modify the sample location based on the results of the image adjustment module. Sampler 534 reads the color field RGB information at the field rate and applies the final set of uv values from animation correction 532 to select a final sample location for each pixel.

The output of the sampled color field is then provided to an optional display calibration module 536. Display calibration module can provide various calibrations based on the display such as vignette correction, CABC scaling, gamma correction, and masking. The output of the display calibration module 536 includes fields for the display 310 of the mobile device. As illustrated, the adjusted fields are generated at an output field rate that is higher than the frame rate of the core rendering pipeline.

Figure 6:
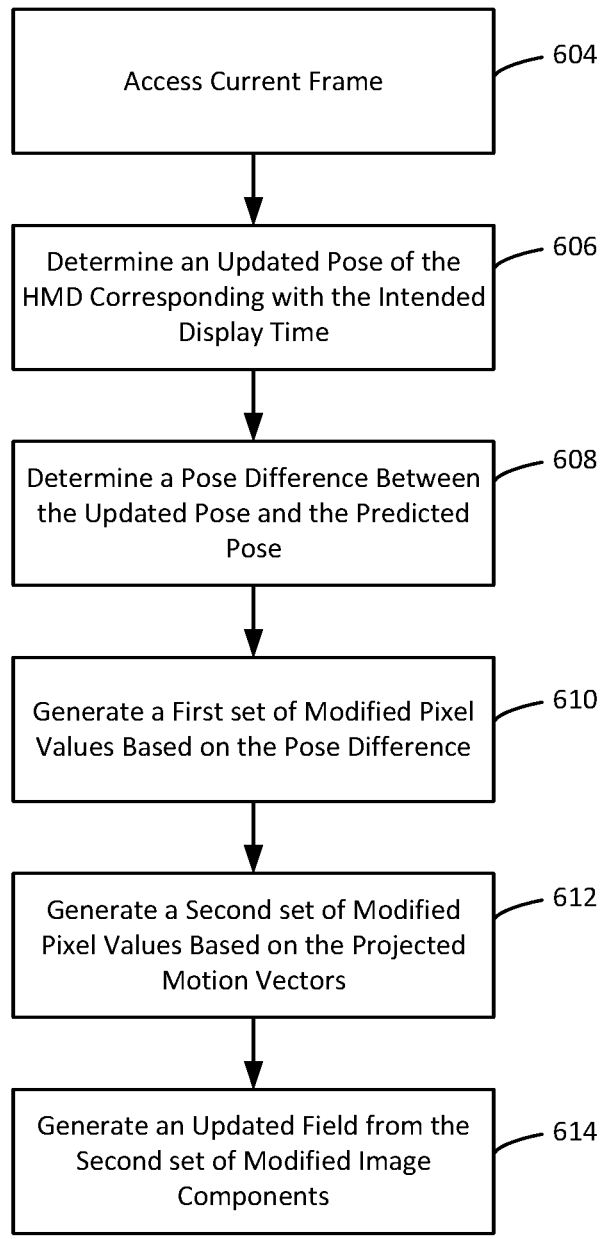
FIG. 6 is a flowchart describing a processing of generating one or more updated images for a current frame in accordance with an embodiment of the disclosed technology.

FIG. 6 is a flowchart describing a process of generating one or more updated images for a current frame rendered by module 302 based on updated pose information and motion vectors for animation within the frames. At step 604, the LSR module accesses the current frame rendered by rendering module 302. At step 606, the LSR module determines an updated pose of the HMD corresponding to an intended display time for the current frame. The LSR module may access the pose history of the HMD including pose information since the current frame was rendered using a first predicted pose to determine a second predicted pose of the HMD at step 606 for the updated pose. The updated pose may be determined based on updated pose information that is provided to a pose tracker at a higher frequency than the rendering frame rate. In one example, the updated pose information may be generated using a low-latency inertial measurement unit (IMU) or combination of IMU and camera-based pose tracking.

At step 608, a pose difference between the first predicted pose used to render the current frame (step 404 of FIG. 3) and the updated pose determined at step 606 is determined. The pose difference may determine a degree of graphical adjustment to be applied to a portion of the rendered image in order to compensate for an updated pose prediction since rendering the current frame.

At step 610, the LSR module generates a first set of modified pixel values such as modified uv values for the current frame based on the pose difference. The modified uv values may be generated via a homographic transformation (e.g., applying a single plane homography or a multi-plane homography) of a portion of the current frame. In some cases, the homographic transformation may comprise an affine transformation of the pre-rendered image of the current frame. The updated image may also be generated using a pixel offset adjustment or a combination of homographic transformations and pixel offset adjustments. The pixel offset adjustment may comprise a two-dimensional pixel shifting of an image. The image this pixel shifted may comprise a portion of a pre-rendered image or a portion of an image that has previously been modified. In some cases, the homographic transformations and/or pixel offset adjustments may be generated using a controller or processor integrated with a display of the HMD. In one embodiment, the pixel offset adjustments may be performed using a display of the HMD that incorporates shift registers or other circuitry for allowing the shifting of pixel values within a pixel array of the display. In another example, a controller or processor integrated with the HMD or display of the HMD may make pixel offset adjustments.

At step 612, the LSR module generates a second set of modified pixel values for the current frame based on the projected motion vectors from step 410 of FIG. 4. The projected motion vectors include the animation velocity for each block of pixels multiplied by the time until the target display time. The projected motion vectors can be applied as an offset to uv values for each pixel received in the first set of modified pixel values.

At step 614, an updated field is generated for the current frame based on the second set of modified pixel values. In one example, the modified uv value for each pixel is used to correct the sample location of a color field stored for the current frame. The updated field includes a modified sample of the source locations from the color filed of the current frame based on the second set of modified uv values. The updated field includes a perspective correction based on the second predicted pose and an animation correction based on the projected motion vectors.

In some cases, the pixel offset adjustments may be generated using a controller or processor integrated with a display of the HMD or using custom circuitry integrated within the display. In one embodiment, the pixel offset adjustments may be performed using a display of the HMD that incorporates shift registers or other circuitry for allowing the shifting of pixel values within a pixel array of the display.

Figure 7:
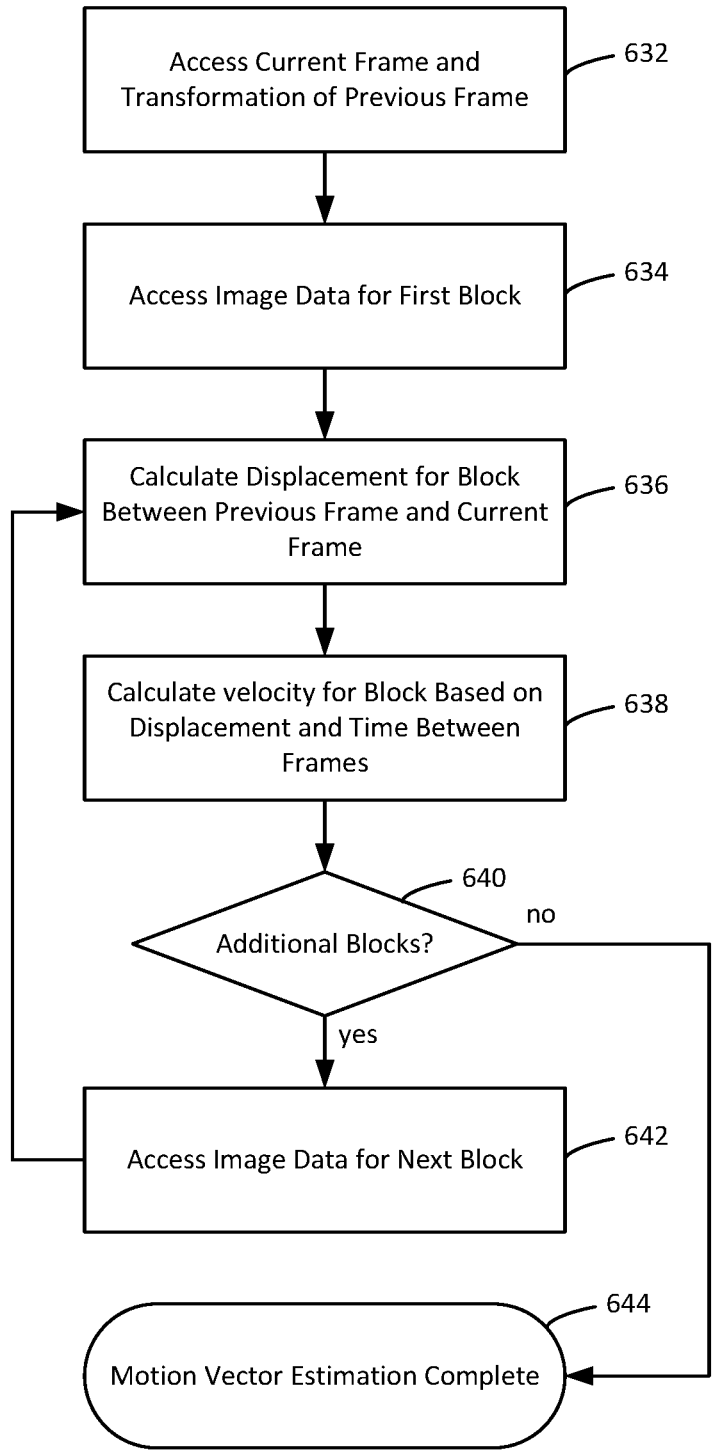
FIG. 7 is a flowchart describing a process of calculating a set of motion vectors for a current frame in accordance with an embodiment of the disclosed technology.

FIG. 7 is a flowchart describing a process of calculating a set of motion vectors for a current frame according to one embodiment of the disclosed technology. At step 632, the current frame rendered by the core rendering pipeline is accessed. A transformation of the previous frame using the pose information associated with the current frame is also accessed.

At step 634, the image data for a first block of one or more pixels of the current frame and the previous frame are accessed. At step 636, a displacement for the block of pixels between the two frames is calculated. Direct per pixel or indirect feature based methods may be used to generate a motion vector for a block of pixels between the previous and current frame. Direct motion vector estimation may be based on block-matching algorithms, phase correlation and frequency domain algorithms, pixel recursive algorithms, and/or optical flow algorithms. Indirect methods may include corner or edge detection. Because the previous frame is transformed to the current pose position, camera motion between the two frames is removed. The motion vectors thus represent animation within the scene, or motion associated with features of the scene.

At step 638, a velocity for the block is calculated using the displacement and the time difference between frames. The time difference between when the previous frame and the current frame are to be displayed is used in one embodiment. In another embodiment, the time difference between rendering the frames may be used. The time between rendering corresponds with the frame rate of the rendering module. For example, if the frames are rendered at 30 fps, the time between rendering the frames is approximately 33 ms.

At step 640, the LSR module determines if additional blocks of pixels should be analyzed to determine a motion vector. If additional blocks remain to be analyzed, the image data for the next block is accessed at step 642. The process then returns to step 636 to begin determining the motion vector for the next block of pixels. If all blocks have been analyzed for the current frame, the motion vector estimation completes at step 644.

Figure 8:
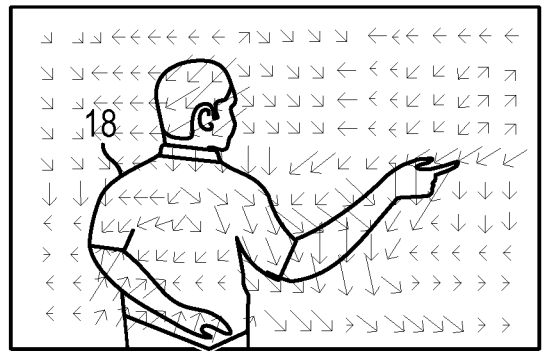
FIG. 8 is a block diagram depicting an example of a rendered image and image vectors in accordance with an embodiment of the disclosed technology.

FIG. 8 is a block diagram depicting an example of a rendered image as may be generated by a rendering module. FIG. 8 illustrates an exemplary set of motion vectors for the rendered image. The motion vectors may be calculated by comparing the rendered image with a previous image rendered by the rendering module, such as the previous frame immediately preceding the current frame of the rendered image. The motion vectors are generated by comparing features or pixels within each block between the two frames to statistically or otherwise estimate motion at the block between the two frames. In this example, the motion vectors are illustrated by arrows. The length of the arrow corresponds with the size of the motion vector. A longer arrow indicates a larger motion vector representing a larger movement at the block between frames. A smaller arrow indicates a smaller motion vector representing a smaller movement at the block between frames.

Figure 9:
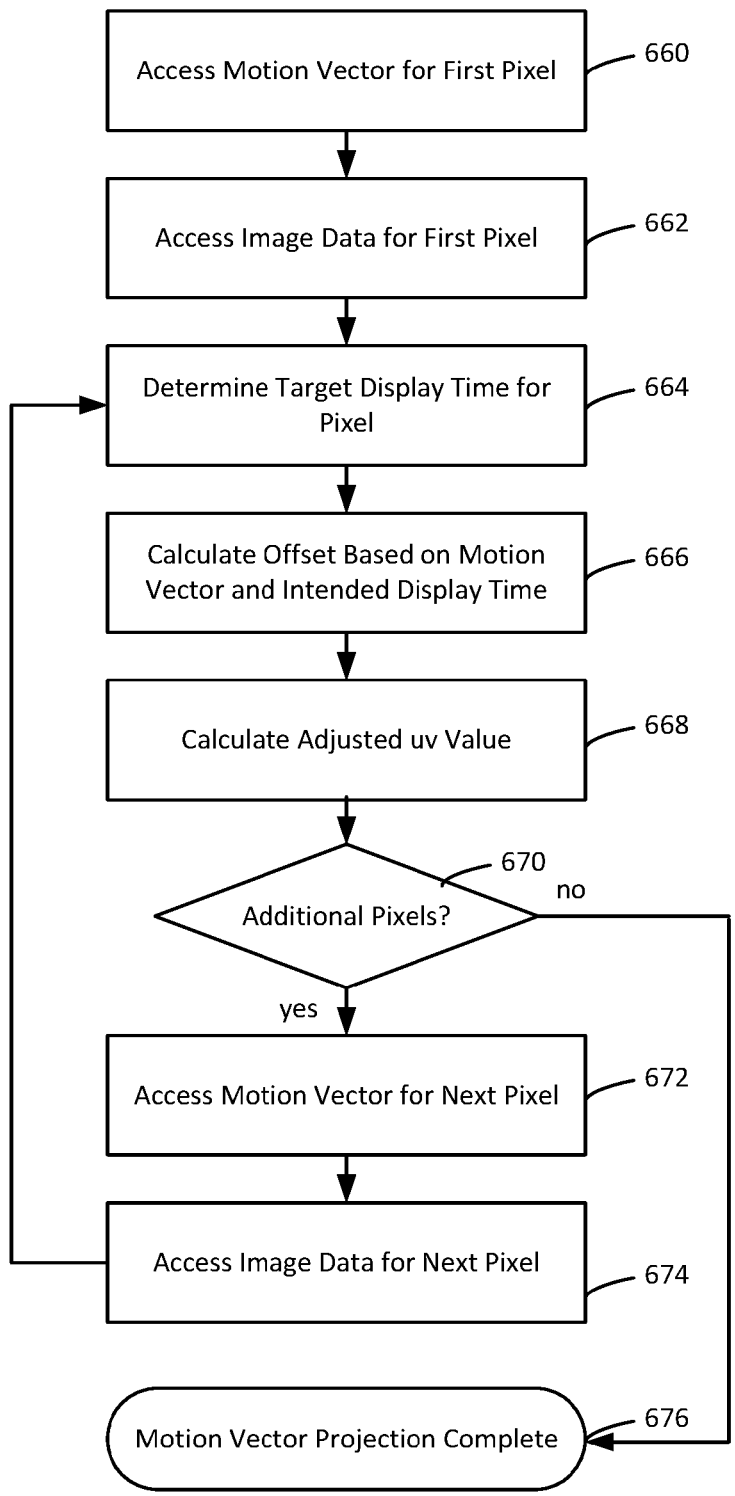
FIG. 9 is a flowchart describing a process of projecting a set of motion vectors for a current frame in accordance with an embodiment of the disclosed technology.

FIG. 9 is a flowchart describing a process of projecting a set of motion vectors for a current frame for one or more intended display times of the pixels of the frame. At step 660, the motion vector for a first pixel of the current frame is accessed. At step 662, the image data such as the uv values for the first pixel are accessed. The set of uv values in the process of FIG. 9 may be the original uv values for the current frame or a modified set of uv values as may be calculated during a perspective correction or other process. At step 664, the target display time for the selected pixel, in this case the first pixel, is determined. At step 666, an animation offset is calculated for the selected pixel. The animation offset is a value that indicates an animation or motion in the scene for the selected pixel. The offset is calculated using the motion vector and the intended display time for the pixel. The motion vector indicates a velocity for the selected pixel and the intended display time indicates a time between rendering and displaying the current frame. By multiplying the motion vector and the target display time, a displacement for the selected pixel can be determined. The displacement is used to define an offset for the pixel. At step 668, the uv value for the selected pixel is modified by the offset value. The modified uv value results in an adjusted sampling location for the pixel when generating the field for the current frame. The adjusted sampling location compensates for animation at the pixel between rendering the current frame and displaying a field based on the current frame.

At step 670, the system determines whether additional pixels remain to be analyzed for the current frame. If no additional pixels remain, the motion vector projection is complete for the current frame at step 676. The projection provides a set of uv values for the current frame. A uv value for each pixel, indicating an offset sampling location when generating the field for the current frame is provided. If additional pixels remain to be analyzed, the motion vector for the next pixel is accessed at step 672 and the image data for the next pixel is accessed at step 674.

As noted in FIG. 9, different target display times may be used when forward projecting the motion vector to modify the current frame for generating a field for display. For example, a motion vector for a current frame may be projected to a first target time for generating a first field based on the current frame, and may be projected to a second target time for generating a second field based on the current frame.

In addition, the target display time for individual pixels may vary within a single field for display. In a scanning display, different rows of pixels or groups of rows of pixels may be displayed at different times for a current frame as the display is updated in sequence from top to bottom or bottom to top. In such a case, the target display time may vary for different pixels of the current frame. Accordingly, the system may access an individual target display time for the pixels to generate the set of modified uv values.

In another example, a color sequential display may be used where separate red, green, and blue fields are displayed for each frame. In such a case, three fields may be generated and loaded into the display at individual times for a current frame corresponding to each of the three color fields. Each field is displayed sequentially. For example, at a 240 Hz display rate, the display time for each field is 4 ms. The system may utilize updated pose information when generating each field to provide a perspective correction based on camera movement between the fields. Moreover, the system may project the motion vectors individually for each field to correspond with the target display time of the particular field. The system may generate each color field by projecting each motion vector based on different target display times for each color field.

It has been observed, however, that color separation may occur when displaying separate color fields sequentially in a color sequential display. A user of the HMD may visualize each color independently rather than as a composite of each color as intended. While forward projecting frames so that the animation moves with each successive field may alleviate some color separation, it has been observed to introduce other color separation. For example, in regions of the display that are not an area of focus by the user forward projecting the animation for different color fields may introduce color separation at those color fields.

In one embodiment, the system selectively projects animation based on one or more areas of focus of a user viewing the display. The system may utilize eye tracking and/or head tracking information to determine the area(s) of focus or pixels being tracked by the user. The content at a region of the display corresponding to an area of focus or a tracked moving object is forward projected for the individual fields, while content at regions that do not correspond to an area of focus or tracked moving object is not forward projected. By selectively projecting animation within the display, improvements to perceived color separation may be observed.

Figure 10:
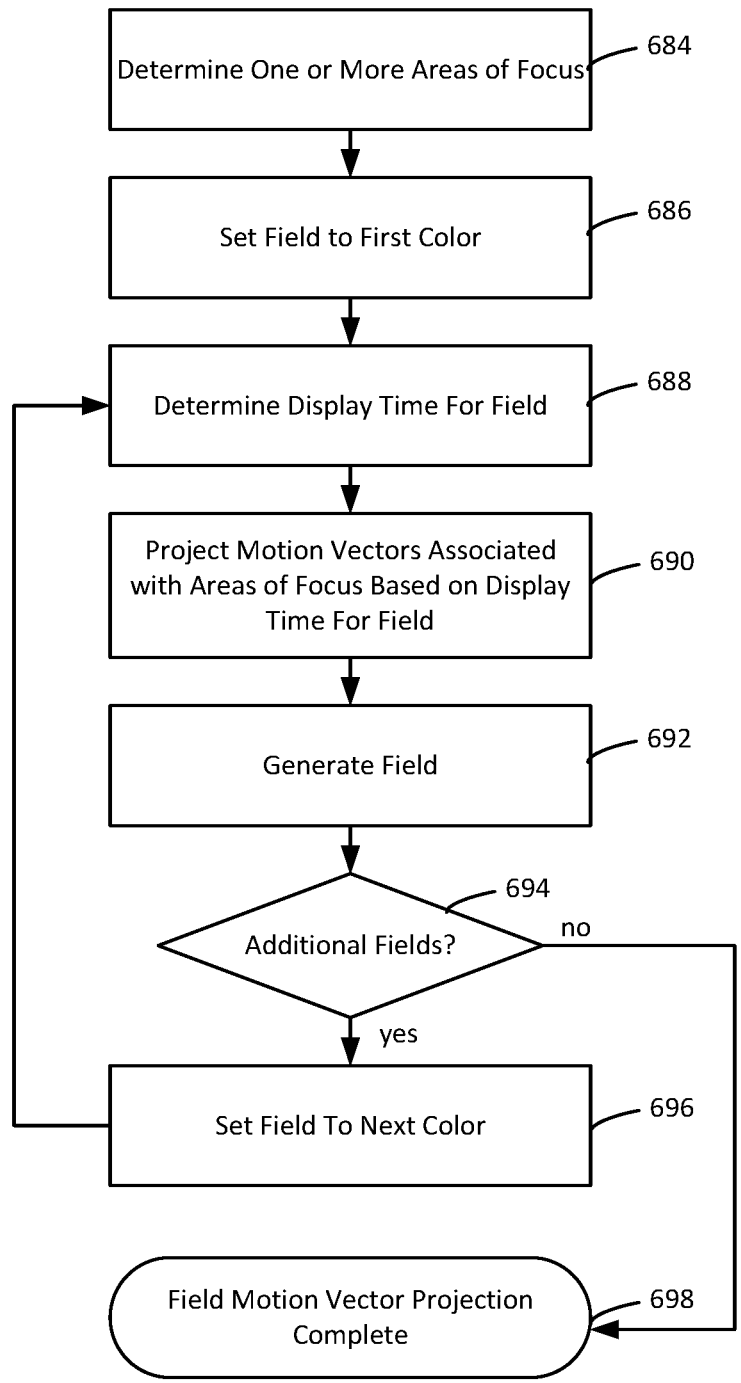
FIG. 10 is a flowchart describing a process of generating fields in accordance with an embodiment of the disclosed technology.

FIG. 10 is a flowchart describing a process of generating fields at a field rate that is greater than a frame rate of a rendering module. In FIG. 10, motion vectors and eye tracking information are used to selectively project animation from a current frame when generating a field for the display.

At step 684, one or more areas of focus within the display are identified. Eye tracking may be used to determine a set of one or more regions of the display being focused on or tracked by the end user within a particular period of time. In one embodiment, the one or more regions may correspond with one or more virtual objects focused on or tracked by the user. The system may identify all objects focused on or tracked by a user and then determine one or more objects that are the most frequently viewed. The virtual object may be associated with a depth or distance from the HMD. In the case of a single plane, the single plane may be selected based on a depth of the most frequently viewed virtual object within the particular period of time. In the case of multiple planes, virtual objects within an augmented reality environment may segmented into a plurality of groups based on proximity to the multiple planes. An object may be mapped to the plane to which it is closest. The system may select one or more planes as the areas of focus for animation correction.

At step 686, the system sets the selected field for the current frame to the first color (e.g., red field). At step 688, the system determines the target display time for the selected field. At step 690, the system selectively forward projects the motion vectors for the pixels within the determined area of focus. The system does not forward project the motion vectors for the pixels outside of the area of focus. Within the area of focus, the system can multiply the motion vector for a selected pixel by the target display time for the selected field to forward project the motion vector. The result of selectively forward projecting the motion vectors is a set of partially modified uv values in one embodiment. The uv values within the area(s) of focus are modified to reflect the animation relative to the rendered frame, while the uv values outside of the area of focus remain at their value as rendered or as previously modified.

At step 692, the selected color field is generated. In one example, the modified uv values are used to determine sample locations of the current frame to generate the selected field. After generating the selected field, the system determines whether additional fields remain to be generated for the current frame. If so, the next color field is selected at step 696 and the process returns to step 688 to determine the display time for the newly selected field. If every field has been generated for the current frame, the motion vector projection completes at step 698.

Accordingly, one embodiment of the disclosed technology includes a mobile device, comprising a display and one or more processors configured to communicate with the display. The one or more processors are configured to access a first frame rendered using first pose information associated with the mobile device and a second frame rendered using second pose information associated with the mobile device, to transform the first frame based on a difference between the first pose information and the second pose information, to determine a set of motion vectors based on animation between the first frame and the second frame after transforming the first frame, and to generate a first field for the display of the mobile device based on the second frame and the set of motion vectors.

One embodiment of the disclosed technology includes a method that comprises rendering a first image based on a first predicted pose associated with a mobile device and a second image based on a second predicted pose associated with the mobile device, generating a projected image based on the first image and the second predicted pose after rendering the second image, determining a set of motion vectors based on the second image and the projected image, generating an updated image for a display of the mobile device based on the second image and the set of motion vectors, and displaying the updated image on the display of the second device.

One embodiment of the disclosed technology includes a computer readable storage medium having computer readable instructions for programming a processor to perform a method that comprises modifying a first frame rendered using a first predicted pose based on a second predicted pose associated with a second frame rendered subsequent to the first frame, determining a set of motion vectors for the second frame based on a comparison of the second frame and the first frame after being modified, generating a first field for a display of a mobile device based on the set of motion vectors and the second frame, and displaying the first field on the display of the mobile device.

Figure 11:
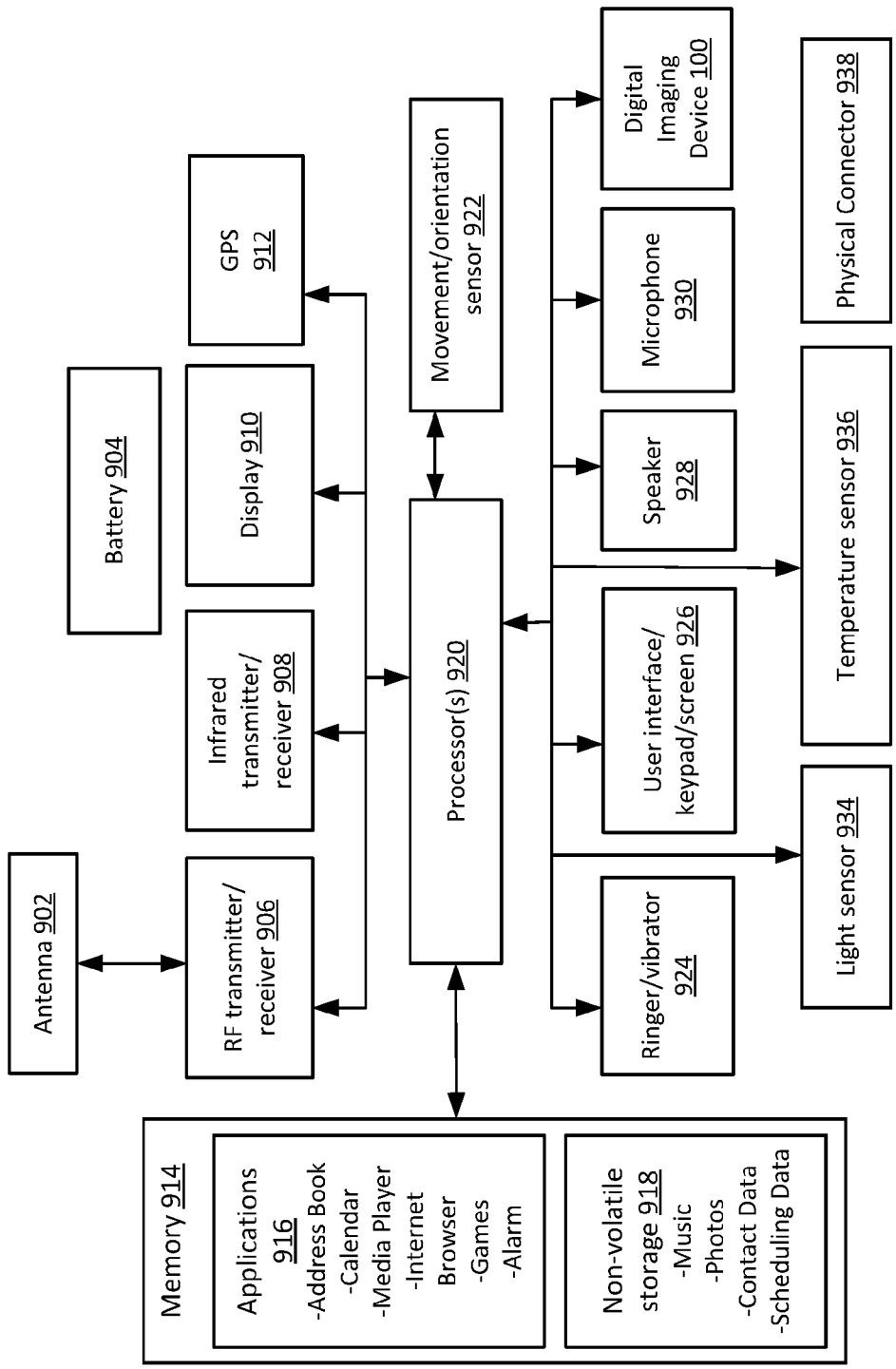
FIG. 11 is a block diagram depicting a mobile computing device.

FIG. 11 is a block diagram of one embodiment of a mobile device 900 such as mobile device 11, 12, or 19 as described in FIG. 1. Mobile devices may include laptop computers, pocket computers, mobile phones, head-mounted displays (HMDs), personal digital assistants, and handheld media devices that have been integrated with wireless receiver/transmitter technology. The mobile device of FIG. 1 is presented by way of example as one illustrative implementation of the disclosed technology. It will be appreciated that a mobile device according to embodiments of the disclosure may include many variations of processor-based devices.

Mobile device 900 includes one or more processors 920 and memory 914. Memory 914 includes applications 916 and non-volatile storage 918. Memory 914 can be any variety of memory storage media types, including non-volatile and volatile memory. For example, memory 914 may include random access memory (RAM), dynamic RAM (DRAM), synchronous DRAM (SDRAM), static RAM (SRAM), or other types of storage devices. A mobile device operating system handles the different operations of the mobile device 900 and may contain user interfaces for operations, such as placing and receiving phone calls, text messaging, checking voicemail, and the like. The applications 916 can be any assortment of programs, such as a camera application for photos and/or videos, an address book, a calendar application, a media player, an internet browser, games, an alarm application, and other applications. The non-volatile storage component 918 in memory 914 may contain data such as music, photos, contact data, scheduling data, and other files.

The one or more processors 920 are in communication with a display 910. The display may be a traditional display, a touchscreen display, or a see-through display that displays one or more virtual objects associated with a real-world environment. The one or more processors 920 also communicate with RF transmitter/receiver 906 which in turn is coupled to an antenna 902, with infrared transmitter/receiver 908, with global positioning service (GPS) receiver 912, and with movement/orientation sensor 922 which may include an accelerometer and/or magnetometer. RF transmitter/receiver 906 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 920 further communicate with a ringer/vibrator 924, a user interface keypad/screen 926, a speaker 928, a microphone 930, a digital image device 100, a light sensor 934, and a temperature sensor 936. The user interface keypad/screen may include a touch-sensitive screen display.

The one or more processors 920 controls transmission and reception of wireless signals. During a transmission mode, the one or more processors 920 provide voice signals from microphone 930, or other data signals, to the RF transmitter/receiver 906. The transmitter/receiver 906 transmits the signals through the antenna 902. The ringer/vibrator 924 is used to signal an incoming call, text message, calendar reminder, alarm clock reminder, or other notification to the user. During a receiving mode, the RF transmitter/receiver 906 receives a voice signal or data signal from a remote station through the antenna 902. A received voice signal is provided to the speaker 928 while other received data signals are processed appropriately.

Additionally, a physical connector 938 may be used to connect the mobile device 900 to an external power source, such as an AC adapter or powered docking station, in order to recharge battery 904. The physical connector 938 may also be used as a data connection to an external computing device. The data connection allows for operations such as synchronizing mobile device data with the computing data on another device.

The disclosed technology is operational with numerous general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules or units, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

One or more embodiments of the present disclosure may include a variety of computer readable media. Computer readable media can be any available media that can be accessed by a computing device and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any non-transitory method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the information and which can be accessed by a computing device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The disclosed technology may be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
 a display; and
 one or more processors configured to communicate with the display, one or more of the processors being configured to access a first frame whose data has been rendered and whose data has been thereafter pose-wise adjusted using first pose information associated with a first pose for the mobile device and to access a second frame whose data has been rendered and thereafter pose-wise adjusted using different second pose information associated with a second pose for the mobile device, the second pose occurring after the first pose, one or more of the processors being configured to transform the first frame based on a difference between the first pose information and the second pose information such that the transformed first frame appears as if the transformed first frame had been generated to correspond with the later occurring second pose, one or more of the processors being configured to determine a set of motion vectors based on inferred image animation between the transformed first frame and the second frame, and one or more of the processors being configured to generate a first field for display by the display of the mobile device based on the second frame and the determined set of motion vectors.

2. The mobile device of claim 1, wherein:
each motion vector is associated with a block of one or more pixels of the display;
determining the set of motion vectors includes determining a velocity for each block based on displacement associated with the block and a first time associated with the first frame and a second time associated with the second frame; and
the one or more processors are configured to determine a set of offsets for a set of pixels of the display based on the velocity of the block and a target display time of each pixel.

3. The mobile device of claim 2, wherein:
the first pose information corresponds to a first predicted pose of a camera portion of the mobile device and the second pose information corresponds to a second predicted pose of the camera portion of the mobile device.

4. The mobile device of claim 3, wherein:
the target display time is associated with third pose information corresponding to a third predicted pose of the camera portion of the mobile device, the third predicted pose being associated with a point in time between the second predicted pose and the first predicted pose.

5. The mobile device of claim 3, wherein:
the target display time is associated with third pose information corresponding to a third predicted pose of the camera portion of the mobile device, the third predicted pose being associated with a point in time following the second predicted pose and the first predicted pose.

6. The mobile device of claim 3, wherein the one or more processors are configured to generate the first field by:
determining third pose information corresponding to a third predicted pose subsequent to accessing the second frame;
generating a first set of uv values for the second frame based on a difference between the second pose information and the third pose information; and
modifying the first set of uv values using the offset for each pixel to generate a second set of uv values associated with the target display time for each pixel.

7. The mobile device of claim 6, wherein generating the first set of uv values for the second frame comprises applying a pixel offset adjustment to at least a portion of the second frame.

8. A method, comprising:
rendering a first image based on a first predicted pose associated with a mobile device and rendering a second image based on a different second predicted pose associated with the mobile device;
generating a projected image from a selected one of the rendered first and second images, the projected image being a transformation of the selected one of the rendered first and second images where the transformation causes the projected image to appear as if it were captured using the pose of the other of the rendered first and second images;
determining a set of motion of vectors based on a determined difference between the projected image and the other of the rendered first and second images;
generating an updated image for displaying on a display of the mobile device based on the determined set of motion vectors and at least one of the projected image and the other of the rendered first and second images; and
displaying the updated image on the display.

9. The method of claim 8, wherein the generating of the projected image comprises:
determining a pose difference between the first predicted pose and the second predicted pose; and
applying a homographic transformation to at least a portion of the selected one of the rendered first and second image based on the determined pose difference.

10. The method of claim 8, wherein:
generating the updated image comprises modifying a set of pixel values associated with the at least one of the projected image and the other of the rendered first and second images based on the determined set of motion vectors.

11. The method of claim 10, wherein:
the first image is part of a first rendered frame and the second image is part of a second rendered frame;
the modifying of the set of pixel values comprises modifying a set of uv values; and
the generating of the updated image comprises generating a first field including the updated image.

12. The method of claim 11, further comprising:
determining an area of focus or tracking based on eye tracking information associated with a later timed one of the first and second images;
wherein modifying the set of uv values comprises modifying a subset of the set of uv values that are associated with the area of focus.

13. The method of claim 11, wherein modifying the set of pixel values comprises:
determining at least one target display time for the first field; and
determining a set of offsets based on the set of motion vectors and the at least one target display time.

14. The method of claim 13, wherein determining the set of offsets comprises:
determining a velocity of each motion vector based on a time difference between when the first rendered frame and the second rendered frame are to be displayed.

15. The method of claim 14, wherein:
the display is a scanning display;
determining the at least one target display time comprises determining a plurality of target display times associated with the first field, the plurality of target display times include a first target display time associated with a first pixel in a first row and a second target display time associated with a second pixel in a second row, the second target display time is after the first target display time; and
determining the set of offsets includes determining a first offset for the first pixel based on the first target display time and determining a second offset for the second pixel based on the second target display time.

16. The method of claim 13, wherein:
the display is a color sequential display configured to sequentially display the first field, a second field, and a third field for the second rendered frame;

generating the first field for the display includes projecting the set of motion vectors for a first target display time associated with the first field; and the method further comprises generating the second field by projecting the set of motion vectors for a second target display time associated with the second field, and generating the third field by projecting the set of motion vectors for a third target display time associated with the third field.

17. A hardware computer readable storage medium storing computer readable instructions which, when executed by a processor, cause the processor to perform acts comprising:

modifying a first frame that has been rendered using a first predicted pose of a posable mobile device, the modifying being based on a different second predicted pose associated with a second frame rendered subsequent to the first frame, said modifying causing the modified first frame to appear as if the modified first frame were captured using the second pose;

determining a set of motion vectors for the second frame based on a comparison of the second frame and the modified first frame;

generating a first field for a display of the mobile device based on the set of motion vectors and the second frame; and displaying the first field on the display of the mobile device.

18. The hardware computer readable storage medium of claim 17, wherein modifying the first frame based on the second predicted pose associated with the second frame comprises:

determining a pose difference between the first predicted pose and the second predicted pose; and applying a homographic transformation to at least a portion of the first frame based on the pose difference.

19. The hardware computer readable storage medium of claim 17, wherein the acts further comprise:

determining an area of focus associated with the second frame;

projecting a subset of the set of motion vectors based on one or more target display times associated with the area of focus;

accessing a set of pixel values associated with the second frame including a first subset of pixel values associated with the area of focus and a second subset of pixel values associated with at least one additional area outside of the area of focus; and modifying a first subset of the set of pixel values associated with the second frame based on projecting the subset of motion vectors to generate a first subset of modified pixel values for the area of focus and a second subset of unmodified pixel values for the at least one additional area;

wherein generating the first field for the display of the mobile device comprises sampling based on the first subset of modified pixel values for the area of focus and sampling based on the second subset of unmodified pixel values for the at least one additional area.

20. The hardware computer readable storage medium of claim 19, wherein:

the display is a color sequential display configured to sequentially display the first field, a second field, and a third field for the second rendered frame;

generating the first field for the display includes projecting the set of motion vectors for a first target display time associated with the first field; and the acts further comprise generating the second field by projecting the set of motion vectors for a second target display time associated with the second field, and generating the third field by projecting the set of motion vectors for a third target display time associated with the third field.

* * * * *